United States Patent [19]
Munday et al.

[11] Patent Number: 5,377,221
[45] Date of Patent: Dec. 27, 1994

[54] COMMUNICATIONS SYSTEM

[75] Inventors: Peter J. Munday; Nicholas R. Massey; David Harmer; James M. Jeffries, all of Reading, England

[73] Assignee: Racal Research Limited, England

[21] Appl. No.: 784,666

[22] Filed: May 10, 1985

[30] Foreign Application Priority Data

May 12, 1984 [GB] United Kingdom ............... 8412189

[51] Int. Cl.⁵ .................................................. H04K 1/00
[52] U.S. Cl. ....................................... 375/1; 455/63; 455/103
[58] Field of Search .................. 375/1, 2.2, 40, 107; 455/1, 52.1, 63, 77, 134, 34.2, 234.1, 257; 370/93

[56] References Cited

U.S. PATENT DOCUMENTS

| | | | |
|---|---|---|---|
| 4,383,323 | 5/1983 | Timor | 375/2.2 X |
| 4,476,566 | 10/1984 | Dent | 375/1 |
| 4,479,226 | 10/1984 | Prabhu et al. | 375/2.2 X |
| 4,494,238 | 1/1985 | Groth, Jr. | 375/1 |
| 4,554,668 | 11/1985 | Deman et al. | 375/1 |
| 4,742,565 | 5/1988 | Iwahashi | 455/234 |
| 4,768,220 | 8/1988 | Yoshihara et al. | 379/63 |

Primary Examiner—John B. Sotomayor
Attorney, Agent, or Firm—Larson and Taylor

[57] ABSTRACT

A frequency hopping radio communications system has a plurality of radios each incorporating a transmitter and a receiver. When a radio is not transmitting or receiving, a switch switches it into a mode in which it monitors the signal strength in each of the available hop channels so as to assess the level of interference, and selects a subset of the total number of channels, those having the lowest interference level. The identities of this subset of channels are stored in a store. When the radio is to transmit a message, it first transmits the identities of the subset of channels stored in the store—using the full number of hop channels (the information being transmitted with sufficient redundancy to overcome likely interference). The receiving radios receive the identities of the subset of channels. The transmitting radio then transmits, pseudo-randomly, on this subset only and each of the receivers receives on this subset only. In this way, transmission and reception takes place only on the channels where the interference is low.

13 Claims, 2 Drawing Sheets

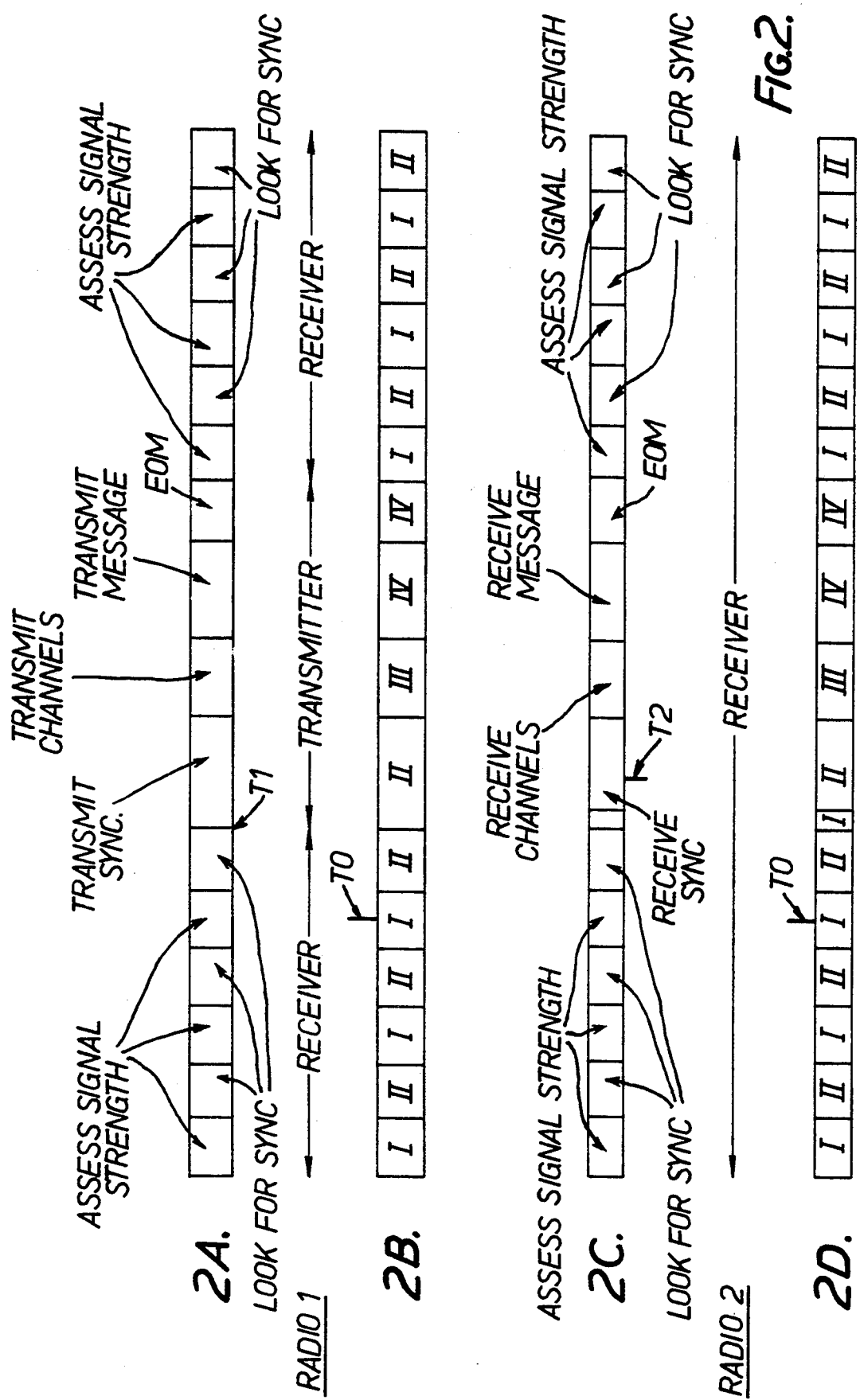

COMMUNICATIONS SYSTEM

BACKGROUND OF THE INVENTION

The invention relates to communications systems and methods. In a more specific sense, the invention relates to a radio communications system involving frequency hopping, that is, a system in which the channel frequency of a transmitter in the system is rapidly changed or "hopped" among a number of values which are advantageously pseudo-randomly selected, the channel frequencies of the receiver or receivers in the system being correspondingly hopped, all with the aim of improving the security of transmission and making effective jamming more difficult.

When such a frequency hopping system is operating in a crowded frequency band (such as HF), difficulties can arise when the current channel frequency is hopped into a particular channel which is already occupied to an extent which causes undue interference.

BRIEF SUMMARY OF THE INVENTION

According to the invention, there is provided a communications system in which transmission means is capable of transmitting on each of a predetermined set of channel frequencies and receiving means is operative to receive transmissions at those channel frequencies, comprising assessment means associated with each transmission means for monitoring the signal strength at each of the channel frequencies in the said set whereby to determine a subset of the said set which subset consists of those channel frequencies carrying reduced signal strength in the absence of any said transmission, first control means associated with the transmission means for controlling the transmission means to transmit the identities of the channels in the said subset, second control means associated with the receiving means and responsive to the receipt by the receiving means of the transmitted identities to control the receiving means to be operative to receive transmissions only at channel frequencies in the subset, and means responsive to a message to be transmitted by the transmission means to transmit the said message using only channel frequencies in the said subset.

According to the invention, there is also provided a radio communications system, comprising a plurality of radios each having a transmitter and a receiver, means in each radio for establishing a predetermined set of channel frequencies and capable of causing the transmitter to transmit on channel frequencies in said set in pseudo-random sequence and of causing the receiver to receive on channel frequencies in the said subset in pseudo-random sequence, means in each radio and operative when that radio is neither transmitting to another one of the radios nor receiving from another one of the radios to activate the receiver to assess the channel strength in each of the channel frequencies in the said set whereby to determine a subset of the said set which subset consists of those channel frequencies carrying lesser signal strength, means in each radio for storing the identities of the channel frequencies in the said subset, transmitter control means in each radio and responsive to an incoming message to be transmitted by that radio to at least one of the other radios to cause the transmitter to transmit to that one radio the identities of the channel frequencies in the said subset using channel frequencies in the said set, receiver control means in each radio for actuating the receiver thereof to receive any such transmitted identities of the channel frequencies in the said subset by receiving at frequencies in the said set, means in each radio for storing the received identities of the channel frequencies in the said subset, means in each radio for causing the transmitter thereof to transmit the said message using channel frequencies in the said subset only, means in each radio for causing the receiver thereof to receive the said message using only the channel frequencies whose identities have been received and stored thereby, and synchronisation means in each radio for providing synchronisation between the channel frequency at which a said transmitter is transmitting and the channel frequency at which a said receiver is receiving.

According to the invention, there is further provided a method of radio communication using a plurality of radios each having a transmitter and a receiver and in which in each radio there is established the same predetermined set of pseudo-randomly arranged channel frequencies at which the transmitter may be caused to transmit and at which the receiver may be caused to receive, in which: (a) when the transmitter of a radio is not transmitting and its receiver is not receiving from another said transmitter, the receiver of that radio monitors the signal strength at each of the channel frequencies in the said set whereby to determine a subset of the said set which subset consists of those channel frequencies carrying lesser signal strength and to store the identities of the channel frequencies in the said subset; (b) when the transmitter of one of the radios is to transmit a message to the receiver of one or more other ones of the radios, it first transmits the said stored identities using channel frequencies in the said set and then transmits the message using only channel frequencies in the said subset; (c) the receiver each of the said one or more ones of the radios receives the transmitted identities using channel frequencies in the said set and stores the received identities and then receives the transmitted message using only the identities of the channel frequencies in the said subset; and (d) synchronisation data is transmitted by each transmitter for reception by the receivers of the said one or more other radios and for synchronising those receivers with that transmitter so that the channel frequency at any time on which the transmitter is transmitting is the same as the channel frequency at which the receivers are receiving at that time.

DESCRIPTION OF THE DRAWINGS

Communications systems and communications methods according to the invention will now be described by way of example and with reference to the accompanying diagrammatic drawings in which:

FIG. 2A–2D are timing diagrams illustrating the operation of the system.

DESCRIPTION OF PREFERRED EMBODIMENTS

Figure 1:
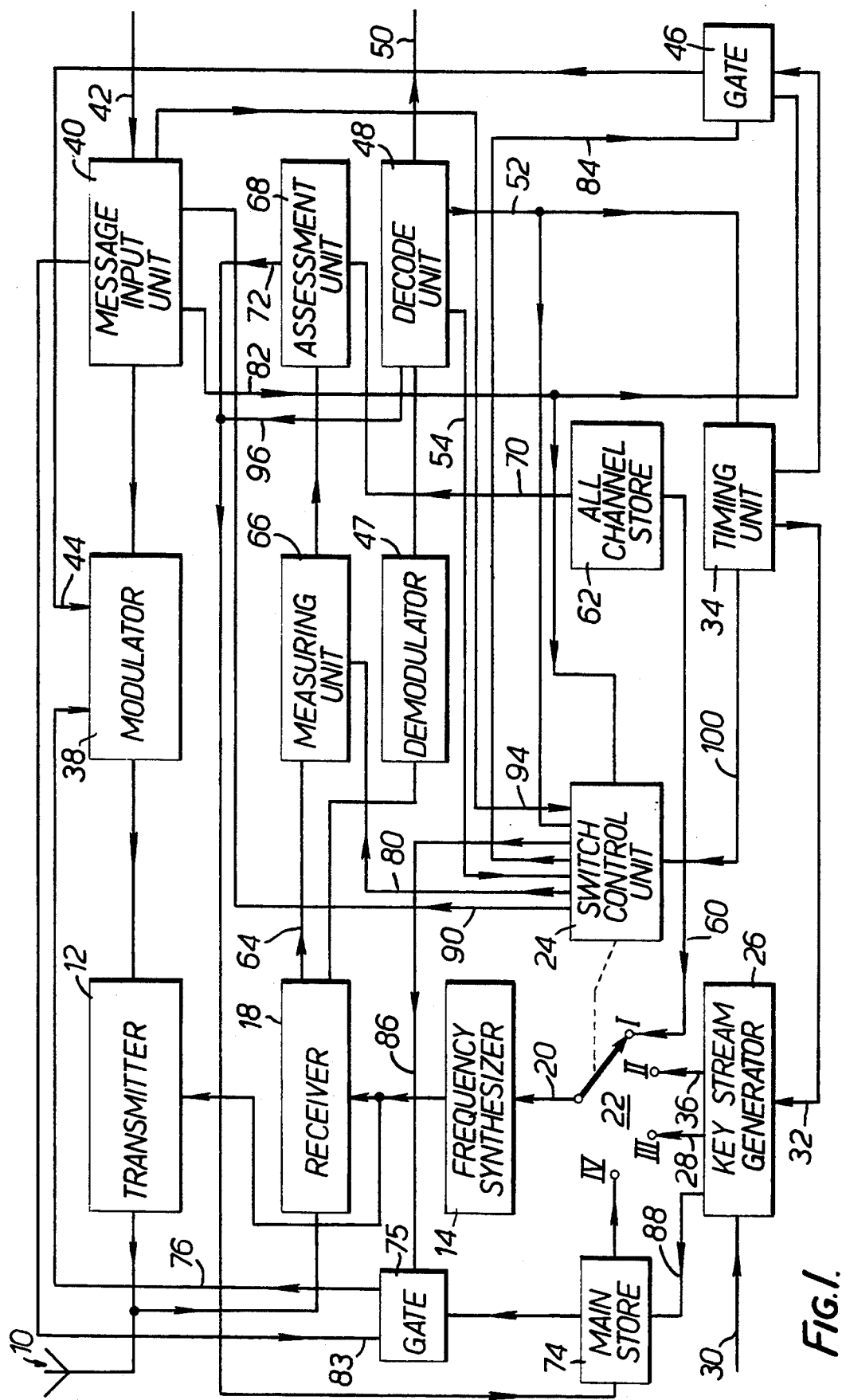
FIG. 1 is a block diagram of a radio in one of the systems.

The system to be described comprises a plurality of radios each of which is capable of acting as a transmitter and as a receiver. The system operates in a frequency hopping mode: that is, a transmitting radio transmits at each of a plurality of different channel frequencies which are pseudo-randomly selected, and of course the receivers have to be synchronised with the pseudo-random sequence so as to be able to receive the transmitted information. In a manner to be explained in more detail, when a radio is not actively transmitting or receiving information it monitors all the possible channels and measures the signal strength in each channel, so as to identify a subset of the total number of possible channels. This subset consisting of the channels which have the lowest interference (that is, the lowest noise and interfering transmissions from transmitters not forming part of the system). When one of the radios is required to transmit information to the other radios, it first transmits the identities of the channels in the selected subset (using the full set of channels), and then uses this subset (that is, it hods among the channels of the subset) to transmit the actual message. In this way, the risk of a transmitter hopping into a channel where there is excessive interference is significantly reduced.

As stated, the described mode of operation means that the data identifying the subset of low-interference channels is transmitted using the full range of channels, some of which, by definition, will contain relatively higher interference. Therefore, the data identifying the subset of the channels is transmitted with sufficient redundancy to overcome any interference, that is, the data is sent more than once.

FIG. 1 shows a block circuit diagram of one of these radios, and the circuit diagram of the other radios in the system is the same.

Each radio preferably operates in the half-duplex mode and comprises an antenna 10 which is driven by normal transmitting circuitry 12 under control of a frequency synthesiser 14. The frequency synthesiser 14 determines the operating channel frequency of the transmitter 12. In addition, each radio has receiving circuitry 18 which is also controlled by the frequency synthesiser 14 and is fed by the antenna 10.

The channel frequency to which the frequency synthesiser 14 controls the transmitter and the receiver 12, 18 is determined by channel data fed to the frequency synthesiser 14 on a line 20 from a switch 22 (which is shown diagrammatically but which would of course be implemented electronically). The switch 22 has four possible positions, I, II, III and IV, and is controlled by a switch control unit 24.

In the example of the system being considered, it is assumed by way of example that the frequency synthesiser 14 can be controlled (in a manner to be explained) so as to change the operating frequencies of the transmitter and receiver 12, 18 fifty times per second, that is, the system has a hop rate of fifty hops per second. Therefore, each hop period (that is, the period for which the transmitter remains at each hop frequency, including the finite time for the transmitter to be set to that frequency) is 20 milliseconds. It will be assumed that the bandwidth within which the hop frequencies lie is 6.4 MHz comprising 256 adjacent 25 kHz channels. The system is therefore capable of hopping into each of these 256 channels in turn, remaining at each channel frequency for 20 milliseconds, that is, for a respective hod period.

A keystream generator 26 generates a sequence of data words identifying which of the 256 channels is to be used during any one hop sequence and outputs this data on a line 28. Therefore, when switch 22 is in position III, the frequency synthesiser 14 switches the transmitter and the receiver 12, 18 to whichever of the 256 channels has been selected. However, the data on line 28 does not identify each of the 256 channels successively in the sequence 1,2... 256 but is arranged to identify the channels in a pseudorandom sequence. The keystream generator is itself controlled by two inputs. First, there is an input on a line 30 which represents the "key of the day". This is a multibit data signal which is fed in manually by the operator and determines the basic pseudo-random sequence. Obviously, the same "key of the day" must be fed into all radios in the system. Secondly, the keystream generator is controlled by a timing signal on a line 32 from a timing unit 34. The signal on line 32 determines the current operating position, within its pseudo-random sequence, of the keystream generator 26 and is used for synchronisation purposes to ensure that all radios have their key stream generators operating in synchronism.

In order for the radios to be synchronised with each other, at least when a message is to be transmitted between them, each radio is capable of transmitting sync data. Sync data is transmitted on predetermined ones of the 256 possible channels. For example, there might be four such sync channels (which would be arranged pseudo-randomly among the 256 channels). Data identifying a pseudo-random selection of the sync channels is output from the keystream generator 26 on a line 36. Therefore, when switch 22 is in position II, the frequency synthesiser 14 is set to the frequency of one of the four sync channels and correspondingly sets the channel frequencies of the transmitter and receiver 12,18.

Data to be transmitted by the transmitter 12 is fed to it via a modulating unit 38. This data may be an actual message, in which case it is fed to the modulator 38 via a message input unit 40 and a line 42, or may be sync data, in which case it is fed to the modulator 38 on a line 44 from the timing unit 34 via a gate 46. In other words, therefore, the sync data comprises the current state of the timing unit 34, and this data is therefore transmitted by the transmitter 12 (on each of the four sync channels) and received by the other radios of the system where it is used to reset their timing units 34 so as to bring them into synchronisation with the timing unit of the transmitting radio, and each such re-set timing unit produces sync data on its line 32 for correspondingly adjusting the respective keystream generator 26.

For processing data received by the receiver 18, each radio has a demodulating unit 47 and the demodulated data is passed to a decoding unit 48. If the received data is an incoming message, this is output on a line 50. If it is received sync data, it is passed on a line 52 to the timing unit 34 for resetting the latter.

The decoder unit 48 is also connected to the switch control unit 24 via a line 54 and activates the switch control unit 24 to perform a predetermined sequence of switching when no message is being received by the receiver 18.

When switch 22 is in position I, the frequency synthesiser 14 receives channel selection data on line 60 from an all-channel store 62. Store 62 stores data identifying all 256 channels and this data output in sequence on line 60 (that is, it is output in a predetermined order which is not necessarily pseudo-random, and is not of course under control of the keystream generator 26). In a manner to be explained in more detail, the store 62 does not control the frequency synthesiser 14 while data messages are being transmitted or received but only during periods when that is not the case. During the time when store 62 is controlling the frequency synthesiser 14 and thus the current channel frequency of the receiver 18, the actual signal strength received in each channel by the receiver 18 is output by the receiver on a line 64 and measured by a measuring unit 66, the measured strength being passed to an assessment unit 68 which also receives data identifying the current channel frequency from the store 62 on a line 70. The assessment unit 68 compares the signal strengths on all of the channels to which the receiver 18 is successively switched, these signal s strengths of course representing noise and transmissions in those channels from transmitters not forming any part of the system under consideration; therefore, the signal strengths represent the levels of "interference". The assessment unit 68 selects those of the 256 channels which are most free of such interference. For example, it may be set to select the 64 channels having the lowest interference and is assumed to do so hereinafter; and in a manner to be explained, data identifying these 64 channels is held in a main store 74. This process, that is, the process just described which operates while switch 22 is in position I, repeats itself for so long as the switch is in this position and the assessment unit 68 continually updates its assessment, that is, the identities of the 64 most interference-free channels. In a manner to be explained, this may be used to update the contents of store 74.

The contents of store 74 may be fed to modulator 38 via a gate 75 and a line 76.

The operation of the system will now be described in more detail and with reference being made to the timing diagram of FIG. 2. For ease of description it will be assumed that the system comprises only two radios, RADIO 1 and RADIO 2 (each as described with reference to FIG. 1) but of course in practice the system is likely to have more than two radios.

It will initially be assumed that neither radio is transmitting or receiving a message. In each radio, therefore, line 54 informs the switch control unit 24 of this, and the switch control unit 24 operates according to a predetermined sequence in which it switches the switch 22 alternately between positions I and II. While the switch is in position I, the store 62 outputs control data to the frequency synthesiser 14 identifying each of the 256 hop channels in turn, and the receiver 18 is thus switched to each of these channels in turn. Switch control unit 24 activates the measuring unit 66 by means of a line 80, and the unit 66 measures the detected signal strength in each of the channels and passes a corresponding signal to the assessment unit 68 which at the same time is provided with data on line 70 identifying the channel whose signal strength is being measured. The assessment unit 68 assesses the 64 channels having the lowest signal strength (that is, the lowest interference).

After a predetermined number of hop periods, switch control unit 24 switches switch 22 to position II. Frequency synthesiser 14 is now set by the keystream generator 26 to one of the four sync channels in pseudo-random sequence, and the receiver 18 monitors each of these channels for the reception of sync date. The sync data will be transmitted according to a predetermined format which will be demodulated by the demodulator 47 and decoded by the decode unit 48. Assuming that neither radio is transmitting at this time, neither radio will detect sync data, and after a predetermined time, switch control unit 24 will switch the switch 22 back to position I. Therefore, the receiver 18 continues switching through the channels under control of the store 62 and the previously described assessment process is continued. Switch control unit 24 then switches the switch 22 back to position I and the receiver searches again for sync data. This process continues in each radio for so long as neither is transmitting a message, and is shown in Diagrams 2A and 2B for RADIO 1 and Diagrams 2C and 2D for RADIO 2. Diagrams 2A and 2C show the operations being carried out by the respective radios, while Diagrams 2B and 2D show the corresponding states of their switches 22. As so far described, neither radio can transmit sync data because gate 46 is held closed by the absence of an enable signal on line 82.

At certain times, data from the assessment unit 68 is loaded in to store 74, for example under operator control or at predetermined times. It will be assumed that such loading takes place at time TO in Radio (FIG. 2).

It will now be assumed that, at time T1 (FIG. 2), a message is received on line 42 in RADIO 1 for transmission to RADIO 2. Receipt of the message is detected by the message input unit 40 which signals this fact to the switch control unit 24 on a line 82 and also enables gate 46 by means of line 82 and gate 75 by means of a line 83. Switch control unit 24 now enters a different sequence and switches the switch 22 to position II. The keystream generator 26 now causes the frequency synthesiser 14 to switch the transmitter 12 to the sync channels in pseudo random sequence. At the same time, unit 24 sends a second enable signal to gate 46 on a line 84. Gate 46 is thus receiving two enable signal s and opens so that sync data representing the current state of the timing unit 34 is fed to the modulating unit 38 on line 44 and transmitted by the transmitter 12. This is shown in Diagram 2A and Diagram 2B.

Switch control unit 24 then switches the switch 22 to position III. The keystream generator 26 therefore now causes the frequency synthesiser 14 to switch the transmitter 12 to pseudo-randomly selected channels in the full set of channels. At the same time, the unit 24 sends an enabling signal to gate 75 on a line 86. Gate 75 is now in receipt of two enable signals and thus opens, and data corresponding to the identity of the 64 channels stored in store 74 is fed to the modulating unit 38 on the line 76 and thus transmitted by transmitter 12, all as shown in Diagrams 2A and 2B.

During this period the identities of the 64 channels in the store 74 are transmitted several times on channels selected from the full set of channels. The resultant redundancy sufficiently increases the chances of the transmitted data successfully reaching the receiver of RADIO 2, even though some at least of the channels in the full set may be channels with significant interference.

Switch control unit 24 now sets switch 22 to position IV, and disables gate 75 via line 86. The synthesiser 14 is thus now controlled by the data in store 74 which is fed out pseudo-randomly from store 74 under control of a pseudo-random sequence derived from the basic pseudo-random sequence in the keystream generator 26 and signalled to store 74 by means of a line 88. The transmitter 12 is thus set to various channels of the 64 channels stored in the store 74—in a pseudo-random manner. At the same time, switch control unit 24 activates the message input unit 40 by means of a line 90 and the latter feeds the actual message to the modulator 38 and it is thus transmitted by the transmitter 12, all as shown in Diagrams 2A and 2B.

At the end of the message, an end-of-message signal is transmitted. Switch control unit 24 also receives the end-of-message signal on a line 94. Switch control unit 24 now resumes the previously described sequence of operations in which it switches switch 22 alternately between positions I and II. The operation of RADIO 2 from time T1 onwards will now be considered with reference to Diagrams 2C and 2D.

Up to time T2, RADIO 2 has its switch 22 switched alternately between positions I and II as already explained. While the switch is set in position II, RADIO 2 is of course monitoring the four predetermined sync channels for sync data. It is assumed that, at time T2, its receiver 18 detects and receives sync data being transmitted by RADIO 1 and this is thus output by the decode unit 48 on line 52 and resets the timing unit 34 into synchronism with the timing unit 34 in RADIO 1. The keystream generator 26 of RADIO 2 is thus synchronised with the keystream generator of RADIO 1.

The signal on line 52 is also fed to the switch control unit 24 in RADIO 2 and causes the unit 24 to enter a different sequence of operation in which it first switches the switch 22 to position III. The frequency synthesiser 14 is thus switched through the basic pseudo-random sequence of the keystream generator 26, and the receiver 18 in RADIO 2 is thus controlled accordingly as shown in Diagrams 2C and 2D. Receiver 18 will therefore receive the data being transmitted by RADIO 1 at this time, this data of course comprising the data in the store 74 of RADIO 1 identifying the 64 low-interference channels. This data is decoded by decode unit 48 and output on a line 96 and fed to the store 74 in RADIO 2 via line 72, replacing any data in that store.

Switch control unit 24 now switches switch 22 to position IV. The frequency synthesiser 14 of RADIO 2 is now fed with the channel data stored in store 74, this data being fed out according to the pseudo-random sequence of the keystream generator 26. Receiver 18 in RADIO 2 is thus switched to pseudo-randomly selected channels from store 74, in accordance with the pseudo-random sequence and in synchronism with the transmitter 12 of RADIO 1. Receiver 18 of RADIO 2 thus receives the data message transmitted from RADIO 1 and this message is output on line 50. When the end-of-message signal is received, this is detected by decode unit 48.

RADIO 2 will now revert to the original sequence in which it alternately monitors all the possible hop channels to assess the interference level and watches for sync data.

The timing unit 34 may be connected to the switch control unit 24 by means of a line 100 so as to maintain the switch control units 24 of the two radios in synchronism.

Although the foregoing description has assumed that four, only, of the 256 channels are used for sending sync data, the system may have an alternative mode of operation in which extra sync data is sent under certain circumstances. For example, when the transmitter of one of the radios is about to transmit a message, it may transmit such extra sync data by transmitting it on a much greater number of the 256 channels, reverting to the mode in which it transmits sync data only on the four sync channels once synchronisation has taken place. Arrangements for enabling synehronisation of radios in a frequency hopping communications system are disclosed in detail in our co-pending United Kingdom Patent Application No. 8119492 (Serial No. 2100944).

It is not necessary for the channel data in store 74 of a transmitting radio to be transmitted at the start of every data message. It is only necessary to transmit this date if it is different from what it was during the previous transmission received or transmitted.

The numerical values given are given purely by way of example.

What is claimed is:

1. A radio communications system in which each of a plurality of transmission means is capable of transmitting transmissions on each of a predetermined set of channel frequencies and each of a plurality of receiving means is associated with a respective one of the transmission means and is capable of receiving said transmissions at the respective channel frequencies, comprising assessment means associated with each receiving means for monitoring the received signal strength at each of the channel frequencies in the said set when the receiving means is not receiving said transmissions, whereby to determine a subset of the said set which subset consists of those channel frequencies carrying reduced signal strength in the absence of any said transmission, first control means associated with each transmission means for controlling the transmission means to transmit the identities of the channels in the said subset determined by the associated receiving means, second control means associated with each receiving means and responsive to the receipt by the receiving means of the transmitted identities to control the receiving means to be operative to receive the transmissions only at channel frequencies in the subset, and means responsive to a message to be transmitted by each transmission means to cause that transmission means to transmit the said message using only channel frequencies in the subset at which the associated receiving means is operative to receive transmissions.

2. A system according to claim 1, including synchronisation means for synchronising the transmission means and the receiving means so as to produce synchronisation between the channel frequencies at which each transmission means is transmitting and the channel frequencies at which each receiving means is operating.

3. A system according to claim 1, including randomising means associated with each transmission means and with each receiving means for pseudo-randomly selecting the channel frequencies from the said set and the channel frequencies from the said subset.

4. A system according to claim 1, in which the said first control means comprises means to control each transmission means to transmit the identities of the channel frequencies in the said subset using channel frequencies from the said set, and the second control means comprises means to control each receiving means to operate at the channel frequencies of the said set to receive the transmitted identities of the channels in the said subset.

5. A system according to claim 4, in which the first control means comprises means to control each transmission means to transmit the identities of the channels in the said subset for a plurality of times.

6. A system according to claim 1, including a plurality of physically separated stations at each of which there is a said transmission means and a said receiving means.

7. A radio communications system, comprising
a plurality of radios each having a transmitter and a receiver, means in each radio for establishing a predetermined set of channel frequencies and capable of causing the transmitter to transmit on channel frequencies in the said set in pseudo-random sequence and of causing the receiver to receive on channel frequencies in the said subset in pseudo-random sequence, means in each radio and operative when that radio is neither transmitting to another one of the radios nor receiving from another one of the radios to activate the receiver to assess the channel strength in each of the channel frequencies in the said set whereby to determine a subset of the said set which subset consists of those channel frequencies carrying lesser signal strength, means in each radio for storing the identities of the channel frequencies in the said subset, transmitter control means in each radio and responsive to an incoming message to be transmitted by that radio to at least one of the other radios to cause the transmitter to transmit to that one radio the identities of the channel frequencies in the said subset using channel frequencies in the said set, receiver control means in each radio for actuating the receiver thereof to receive any such transmitted identities of the channel frequencies in the said subset by receiving at frequencies in the said set, means in each radio for storing the received identities of the channel frequencies in the said subset, means in each radio for causing the transmitter thereof to transmit the said message using channel frequencies in the said subset only, means in each radio for causing the receiver thereof to receive the said message using only the channel frequencies whose identities have been received and stored thereby, and synchronisation means in each radio for providing synchronisation between the channel frequency at which a said transmitter is transmitting and the channel frequency at which a said receiver is receiving.

8. A system according to claim 7, in which the said transmitter control means in each radio comprises means to cause the transmitter thereof to transmit the identities of the channel frequencies in the said subset for a plurality of times whereby to increase the chances of those identities being received by the receiver of the said at least one radio.

9. A system according to claim 7, in which the synchronisation means in each radio comprises means operative to cause the transmitter of that radio to transmit synchronisation data to the other radios using predetermined ones, only, of the channel frequencies in the said set, and each radio includes assessment means operative when the transmitter of that radio is not transmitting a said message to cause the receiver of that radio to switch repeatedly between a first condition in which it monitors the said predetermined ones of the channel frequencies in the said set, whereby to respond to any received said synchronisation data by synchronising itself thereto, and a second condition in which it activates the said assessment means.

10. A method of radio communication using a plurality of radios each having a transmitter and a receiver in which in each radio there is established the same predetermined set of channel frequencies at which the transmitter may be caused to transmit and at which the receiver may be caused to receive, in which method:

(a) when the transmitter of a radio is not transmitting and its receiver is not receiving from another said transmitter, the receiver of that radio monitors the signal strength at each of the channel frequencies in the said set whereby to determine a subset of the said set which subset consists of those channel frequencies carrying lesser signal strength and to store the identities of the channel frequencies in the said subset; (b)

when the transmitter of one of the radios is to transmit a message to the receiver of one or more other ones of the radios, it first transmits the said stored identities using channel frequencies in the said set and then transmits the message using only channel frequencies in the said subset;

(c) the receiver in each of the said one or more ones of the radios receives the transmitted identities using channel frequencies in the said set and stores the received identities and then receives the transmitted message using only the identities of the channel frequencies in the said subset; and (d) synchronisation data is transmitted by each transmitter for reception by the receivers of the said one or more other radios and for synchronising those receivers with that transmitter so that the channel frequency at any time on which the transmitter is transmitting is the same as the channel frequency at which the receivers are receiving at that time.

11. A method according to claim 10, in which the synchronisation data is sent on predetermined ones, only, of the channel frequencies in the said set.

12. A method according to claim 11, in which, when the transmitter of one of the radios is not transmitting and its receiver is not receiving from another said transmitter, that receiver is periodically rendered operative at each of the said predetermined ones of the channel frequencies in the said set, for receiving the synchronisation data.

13. A method according to claim 10, in which the said identities are transmitted a plurality of times whereby to increase the chances of their correct reception by the receiver of the said one or more radios.

* * * * *